United States Patent
Hawkes et al.

(10) Patent No.: US 7,756,269 B2
(45) Date of Patent: Jul. 13, 2010

(54) CRYPTOSYSTEM FOR COMMUNICATION NETWORKS

(75) Inventors: Philip Michael Hawkes, Burnwood (AU); Roy Franklin Quick, San Diego, CA (US); Gregory Gordon Rose, Concord (AU)

(73) Assignee: QUALCOMM Incorporated, San Diego, CA (US)

( * ) Notice: Subject to any disclaimer, the term of this patent is extended or adjusted under 35 U.S.C. 154(b) by 1510 days.

(21) Appl. No.: 10/388,669

(22) Filed: Mar. 14, 2003

(65) Prior Publication Data

US 2004/0179679 A1    Sep. 16, 2004

(51) Int. Cl.
*H04L 9/00* (2006.01)
(52) U.S. Cl. ...................................................... 380/30
(58) Field of Classification Search ............. 380/28–30, 380/277, 282, 285, 45, 44; 708/490, 491
See application file for complete search history.

(56) References Cited

U.S. PATENT DOCUMENTS

| | | | | |
|---|---|---|---|---|
| 6,081,597 | A * | 6/2000 | Hoffstein et al. | 380/28 |
| 6,298,137 | B1 * | 10/2001 | Hoffstein et al. | 380/30 |
| 6,788,788 | B1 * | 9/2004 | Kasahara et al. | 380/277 |
| 7,031,468 | B2 * | 4/2006 | Hoffstein et al. | 380/28 |
| 7,080,255 | B1 * | 7/2006 | Kasahara et al. | 713/182 |
| 7,136,484 | B1 * | 11/2006 | Koh | 380/28 |
| 2004/0151309 | A1 * | 8/2004 | Gentry et al. | 380/30 |

* cited by examiner

*Primary Examiner*—Beemnet W Dada
(74) *Attorney, Agent, or Firm*—Won Tae Kim

(57) ABSTRACT

The REX cryptosystem presented herein is a variant of the NTRU cryptosystem. In the REX cryptosystem, a primary ring $R_{XOR}$ and two secondary rings $R_{XOR,q}$ and $R_{XOR,p}$ are used to reduce the number of operations required to compute the keys, to perform the encryption process, and to perform the decryption process. The REX cryptosystem may also be implemented using Walsh-Hadamard transformations to significantly increase speed.

8 Claims, 6 Drawing Sheets

PUBLIC KEY GENERATION

PUBLIC KEY GENERATION

Encryption

Decryption

CRYPTOSYSTEM FOR COMMUNICATION NETWORKS

BACKGROUND

1. Field

The present invention relates generally to communications, and more specifically, to an improved cryptosystem for encrypting traffic transmitted on communication networks.

2. Background

In both wired and wireless communication systems, a need exists to be able to transmit information secure from both inadvertent eavesdroppers and intentional wrongdoers. Due to the public nature of the transmission media for wireless communications, privacy is a particularly important issue for many mobile handheld users. Although various encryption techniques exist for concealing private matters from public scrutiny, implementation of encryption techniques in small, resource-limited devices, such as mobile handheld units, are often problematic. The computational complexity of a secure encryption scheme can be immense, which slows the speed at which information can be encrypted. A fundamental goal in the art of encryption design is to provide security without sacrificing speed.

SUMMARY

Methods and apparatus are presented herein to address the need stated above. In one aspect, a method is presented for creating two private keys and a public key for a ring-based cryptosystem, the method comprising: selecting a primary vector from a primary ring $R_{XOR}$, wherein the primary ring $R_{XOR}$ has elements from the set of N-dimensional vectors with integer coefficients $Z^N$ and is distinguished by the specified operations; computing a first private key from a secondary ring $R_{XOR,q}$, wherein $R_{XOR,q}$ comprises the elements of $R_{XOR}$ reduced modulo q, such that the first private key is a multiplicative inverse of the primary vector in $R_{XOR,q}$; computing a second private key from a secondary ring $R_{XOR,p}$, wherein $R_{XOR,p}$ comprises the elements of $R_{XOR}$ reduced modulo p, such that the second private key is a multiplicative inverse of the primary vector in $R_{XOR,p}$, and q and p are co-prime integer values; and using the first private key and a secondary vector from the primary ring $R_{XOR}$ to generate a public key, wherein the public key is for encrypting a message and the second private key is used for decrypting the message.

In another aspect, a method is presented for efficiently generating two private keys and a public key for a ring-based cryptosystem, the method comprising: selecting a primary vector from a primary ring $R_{XOR}$, wherein the primary ring $R_{XOR}$ has elements from the set of N-dimensional vectors with integer coefficients $Z^N$ and is distinguished by the specified operations; computing a transform of the primary vector; computing a first private key from a secondary ring $R_{XOR,q}$, wherein $R_{XOR,q}$ comprises the elements of $R_{XOR}$ reduced modulo q, and the first private key is computed using the multiplicative inverse reduced modulo q of each component of the transformed primary vector; computing a second private key from a secondary ring $R_{XOR,p}$, wherein $R_{XOR,p}$ comprises the elements of $R_{XOR}$ reduced modulo p, and the second private key is computed using the multiplicative inverse reduced modulo p of each component of the transformed primary vector, and q and p are co-prime integer values; and using the first private key to generate a public key, wherein the public key is for encrypting a message and the second private key is used decrypting the message.

In another aspect, a method is presented for extracting a message from a ciphertext, wherein the ciphertext is a product of a public key generated from a ring-based cryptosystem, comprising: computing a first vector by multiplying the ciphertext with a first private key in a secondary ring $R_{XOR,q}$; reducing the first vector modulo p in order to derive a second vector; and computing the message by multiplying a second private key with the second vector in a secondary ring $R_{XOR,p}$.

In other aspects, memory elements and processing elements are presented to implement the methods described herein.

DETAILED DESCRIPTION

Figure 1:
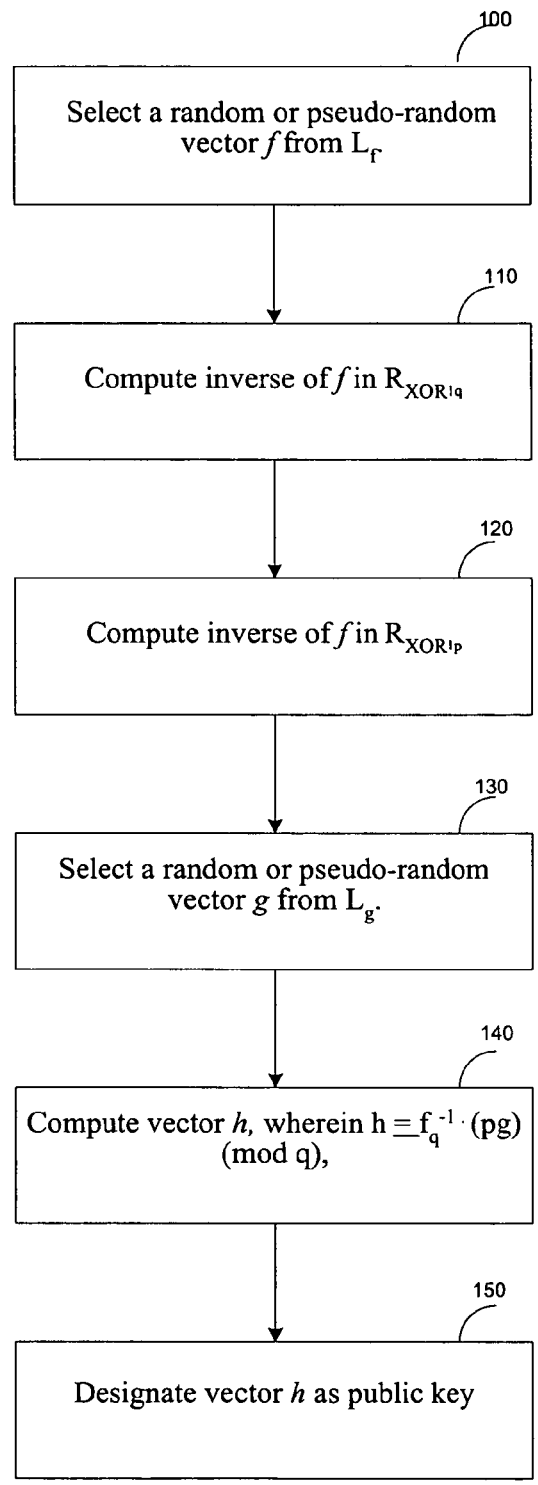
FIG. 1 describes the public key creation step of the REX cryptosystem.

Voice and data traffic transmitted over the wireless and wired portions of a communication system can be subject to interception or diversion to unintended recipients. In order to ensure that private matters remain private, various encryption techniques can be implemented within a communication system. One technique that can be utilized in both wireless and wired communication systems is called public key cryptography. In public key cryptography, any party can use the public key to encrypt a transmission but only the party holding the private key can decrypt the transmission. While straightforward to implement, generic public key cryptosystems suffer from the problems of slow speed and vulnerability to attacks, such as man-in-the-middle attacks and replay attacks.

One particular public key cryptosystem that is designed to be fast and less vulnerable to attacks is the NTRU cryptosystem, presented in U.S. Pat. No. 6,298,137 B1, entitled, "Ring-Based Public Key Cryptosystem Method." In the NTRU cryptosystem, the encryption is based upon polynomial algebra and the decryption is based upon probability theory.

The parameters of an NTRU cryptosystem are (N, q, p, $L_f$, $L_g$, $L_\phi$), where N, q and p are integers and $L_f$, $L_g$ and $L_\phi$ are descriptions of sets of vectors. It is assumed that the greatest common denominator of p and q is 1, and that q is always considerably larger than p. The elements and operations for a NTRU cryptosystem are defined over the polynomial ring $R=Z[X]/(X^N-1)$. $L_f$, $L_g$ and $L_\phi$ are sets in the polynomial ring $R=Z[X]/(X^N-1)$. An element f is defined on the ring R as a polynomial or vector in the form:

$$f = \sum_{i=1}^{N-1} f[i]x^i = (f[0], f[1], K, f[N-i]).$$

The addition operation "+" in the ring R is defined component-wise by the relationship:

$(f+g)[i]=f[i]+g[i].$

The multiplication operation '*' in the ring R represents a cyclic convolution product on ring R, so that h=f*g represents the convolution:

$$h[k] = \sum_{i=0}^{k} f[i]g[k-i] + \sum_{i=k+1}^{N-1} f[i]g[N+k-i] = \sum_{i+j \equiv k \pmod{N}} f[i]g[j].$$

It should be noted that ring theory allows one of skill in the art to illustrate the concepts such as those described herein without detailed, complex mathematical equations, which can be obscure. The example above illustrates this "shorthand," wherein $h=f*g$ on the ring $R=Z[X]/(X^N-1)$ is equivalent to the above calculations for $h[k]$ over the set of integers.

The first step in the NTRU cryptosystem is the creation of the private and public keys using polynomial algebra. Polynomials f and g are chosen. The polynomial g is randomly chosen from the set $L_g$. The polynomial f is chosen randomly from the set $L_f$, with the constraint that polynomial f must have inverses modulo q and modulo p, referred to as $f_q$ and $f_p$, respectively. The inverses can be described mathematically by the following equations:

$f_q*f \equiv 1 \pmod{q}$, and $f_p*f \equiv 1 \pmod{p}$.

After the polynomials f and g are chosen, the polynomials are used to generate a public key h in accordance to the relationship:

$h \equiv f_q*g \pmod{q}$.

The polynomial f is used as the private key by a private key holder. Polynomial g is also held private. The public key h can be sent to individual parties or can be placed in a location accessible to the public. Note that the parameters (N, q, p, $L_f$, $L_g$, $L_\phi$) are also accessible to the public.

At the second step, encryption takes place. A party with a message m acquires the public key h and encrypts the message m by computing the following equation:

$e \equiv p\phi*h + m \pmod{q}$, wherein e is the encrypted message, and $\phi$ is a random polynomial from the set $L_\phi$. The encrypted message e is transmitted to the private key holder.

At the third step, the private key holder receives the encrypted message e and computes the polynomial a in accordance with the following equation:

$a \equiv f*e \pmod{q}$, wherein the coefficients of a are reduced so that the coefficients are within the range $(-q/2, q/2]$. Polynomial a is then used to decrypt the encrypted message e by computing:

$m \equiv f_p*a \pmod{p}$.

The polynomial $f_p$ is already known by the private key holder. Note that the polynomial a is computed to satisfy:

$$a \equiv f*e \equiv f*p\phi*h + f*m \pmod{q}$$
$$= f*p\phi*F_q*g + f*m \pmod{q}$$
$$= p\phi*g + f*m \pmod{q}.$$

The decryption is based on the proposition that if f, g and $\phi$ are in the sets $L_f$, $L_g$ and $L_\phi$ respectively, then there is a high probability that the coefficients of $(p\phi*g)$ and $(f*m)$ are within $(-q/2, q/2]$. Hence, when the private key holder computes $a \equiv f*e \pmod q$ within the interval $(-q/2, q/2]$, she is recovering, with high probability, the polynomial $a = p\phi*g + f*m$ in the polynomial ring $R=Z[X]/(X^N-1)$.

Due to the nature of convolutional products, the NTRU cryptosystem requires $N^2$ multiplications for each product to be computed. This requirement reduces the speed at which encryption and decryption takes place. The embodiments presented herein are improvements to the NTRU cryptosystem by reducing the complexity of the operations needed to generate keys, to encrypt messages, and to decrypt messages.

The improvement to the NTRU cryptosystem is referred to as the Ring Encryption using XOR (REX) cryptosystem. In the REX cryptosystem, a primary ring $R_{XOR}$ and two secondary rings $R_{XOR,q}$ and $R_{XOR,p}$ are used to reduce the number of operations required to compute the keys, to perform the encryption process, and to perform the decryption process.

Let $Z^N$ be the set of vectors of dimension N with integer coefficients. Define the elements of the primary ring $R_{XOR}$ as vectors in $Z^N$ with integer components, such that an element f is defined as $(f[0], \ldots, f[N-1])$. Two operations are defined on the primary ring. The addition operation "+" is defined component-wise by the relationship:

$(f+g)[i] = f[i] + g[i]$.

The multiplication operation "·" in $R_{XOR}$ is defined by the relationship:

$$(f \cdot g)[i] = \sum_{j=0,K,N-1} (f[j]g[i \otimes j]), \text{ for } 0 \le i \le N-1,$$

and the multiplicative identity is the vector $(1, 0, \ldots, 0)$. Note that neither operation involves the modular reduction of the components, unlike the operations within the NTRU cryptosystem. Moreover, even though the primary ring $R_{XOR}$ has the same elements as $Z^N$, $R_{XOR}$ is not equal to $Z^N$, since a multiplication operation is not defined over $Z^N$.

The secondary rings $R_{XOR,q}$ and $R_{XOR,p}$ are then defined with the same operations as $R_{XOR}$. However, the elements of $R_{XOR,q}$ are the elements of the primary ring $R_{XOR}$ with the components reduced modulo q, and the elements of $R_{XOR,p}$ are the elements of the primary ring $R_{XOR}$ with the components reduced modulo p.

Addition of f and g in $R_{XOR,q}$ can be computed by first computing $(f+g)$ in $R_{XOR}$ and then reducing the components modulo q. Similarly, multiplication of f and g in $R_{XOR,q}$ can be computed by first computing $(f \cdot g)$ in $R_{XOR}$ and then reducing the components modulo q. Addition and multiplication in $R_{XOR,p}$ can be computed similarly.

In the embodiments described herein, $R_{XOR,q}$ is defined as the set of vectors of dimension N, with components in the range $(-q/2, q/2]$, subject to the above definitions for addition and multiplication. Under these conditions, $R_{XOR,q}$ forms a ring. Similarly, $R_{XOR,p}$ forms a ring. The multiplicative identity is the vector $(1, 0, \ldots, 0, 0)$ in all three rings $R_{XOR}$, $R_{XOR,q}$ and $R_{XOR,p}$.

The embodiments describing the REX cryptosystem illustrate a four-step process, which comprises a parameter generation step, a public key creation step, an encryption step and a decryption step. In one embodiment of the parameter generation step, six parameters (N, q, p, $L_f$, $L_g$, $L_\phi$) are chosen to attain a certain level of security and to ensure that decryption is successful with high probability. The choice of parameters are conducted in accordance with the following rules:

| | |
|---|---|
| N | Dimensionality value. All elements of $R_{XOR}$ are of dimension N. Must be a power of two, i.e., $N = 2^n$. This differs from the NTRU parameter N in that the NTRU parameter N may be any integer. |
| q | Modulus for the secondary ring $R_{XOR,q}$. The encrypted message is a vector in $R_{XOR,q}$. |
| p | Modulus for secondary ring $R_{XOR,p}$. The message is a vector in $R_{XOR,p}$. |
| $L_f$ | The set of allowable vectors for selecting f. There must exist a vector $f_q^{-1} \in R_{XOR,q}$ such that $f \bullet f_q^{-1} \equiv 1$ (mod q) and there must exist a vector $f_p^{-1} \in R_{XOR,p}$ such that $f \bullet f_p^{-1} \equiv 1$ (mod p). In some embodiments, $L_f$ is defined using a parameter $d_f$ wherein the vector f must have $d_f$ components equal to 1 and $(d_f-1)$ components equal to $-1$, and the remaining components are equal to 0. |
| $L_g$ | The set of allowable vectors for selecting g. In some embodiments, $L_g$ is defined using a parameter $d_g$ wherein the vector g must have $d_g$ components equal to each of 1 and $-1$, and the remaining components are equal to 0. |
| $L_\phi$ | The set of allowable vectors for selecting $\phi$. The message is hidden by adding some randomness, which is provided by a vector $\phi$. In some embodiments, $L_\phi$ is defined using a parameter $d_\phi$, wherein the vector $\phi$ must have $d_\phi$ components equal to each of 1 and $-1$, and the remaining components are equal to 0. |

The parameters are chosen to attain a certain level of security and to ensure that decryption is successful with high probability. In addition to the above rules, p and q must be co-prime. In one embodiment, N and q must also be co-prime in order to apply the inverse Walsh-Hadamard transform as described below.

FIG. 1 describes the public key creation step. Each entity that wishes to receive secure communications using the REX cryptosystem must perform a public key creation step. This entity is referred to hereinafter as "Alice."

At step 100, Alice chooses a random or pseudo-random vector f from the set $L_f$.

At step 110, Alice computes the vector inverse $f_q^{-1}$ of f in $R_{XOR,q}$.

At step 120, Alice computes the vector inverse $f_p^{-1}$ of f in $R_{XOR,p}$.

At step 130, Alice chooses a random or pseudo-random vector g from the set $L_g$.

At step 140, Alice computes the vector h corresponding to:

$$h \equiv f_q^{-1} * (pg)(\text{mod } q),$$

wherein pg has the components of g multiplied by the integer p.

At step 150, Alice designates the vector h as the public key, the vectors f as the first private key and the vector $f_p^{-1}$ as the second private key. The vector g is not required for encryption or decryption and may be discarded. Once a public key is created, Alice can post the public key in a public forum or may send the public key directly to any party that wishes to transmit encrypted messages to Alice.

Figure 2:
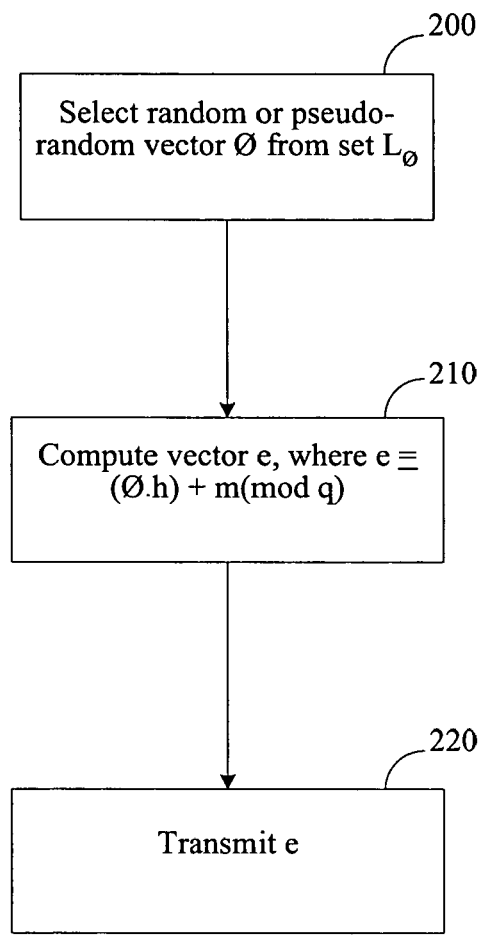
FIG. 2 describes the encryption step of the REX cryptosystem.

FIG. 2 describes the encryption step. Let message m be a vector with components in the range $[0, \ldots, p-1]$. Hence, message m can be considered as a vector in the ring $R_{XOR,p}$. Given the public key h, an entity that wished to encrypt a message targeted for Alice can perform the following steps to encrypt the message m. The entity that wishes to encrypt the message is referred to hereinafter as "Bob."

At step 200, Bob chooses a random or pseudo-random vector $\phi$ from the set $L_\phi$.

At step 210, Bob computes a vector $e \equiv (\phi \cdot h) + m$ (mod q).

At step 220, Bob transmits the vector e to Alice, wherein vector e is the encrypted message.

Figure 3:
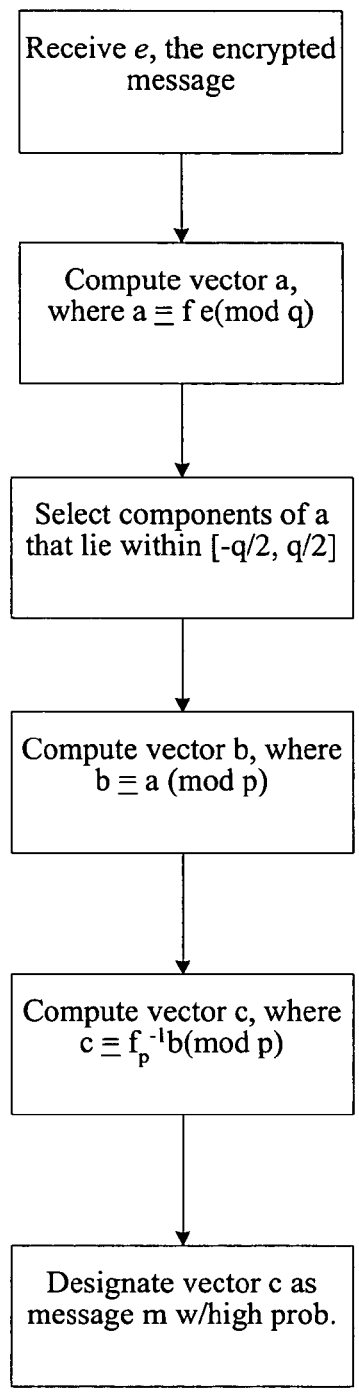
FIG. 3 describes the decryption step of the REX cryptosystem.

FIG. 3 describes the decryption step. At step 300, Alice receives a transmission e. At step 310, Alice computes the vector $a \equiv f \cdot e$ (mod q), wherein f is the first private key of Alice that was computed earlier. At step 320, Alice chooses the components of a so that the components lie within the range $(-q/2, q/2]$.

At step 330, Alice computes the vector $b \equiv a$ (mod p).

At step 340, Alice computes the vector $c \equiv f_p^{-1} \cdot b$ (mod p), wherein the vector $f_p^{-1}$ is the second private key of Alice that was computed earlier.

At step 350, Alice designates the vector c as the message m with high probability.

The steps of FIGS. 1, 2, and 3 are used together to form a cryptosystem wherein the keys and messages are ring elements. Using operations defined upon a ring, it is likely that a message can have more than one possible expression that results from an encryption transformation. In other words, a message vector could be mapped to more than one encryption vector. Hence, the decryption process is premised on probability theory. In particular, the cryptosystem assumes that an encrypted message can be accurately decrypted with high probability if the values of the components are limited to a specific range. The decryption assumption is based upon the following proof.

First, note that the following equations hold true:

$$a \equiv f \cdot e (\text{mod } q)$$
$$\equiv (f \cdot (h \cdot \phi)) + (f \cdot m)(\text{mod } q)$$
$$\equiv ((f \cdot h) \cdot \phi) + (f \cdot m)(\text{mod } q)$$
$$\equiv (pg \cdot \phi) + (f \cdot m)(\text{mod } q).$$

Define $A_1 = (pg \cdot \phi)$ if modular reduction is performed and $A_2 = (f \cdot m)$ where no modular reduction is performed.

The parameters $L_f$, $L_g$ and $L_\phi$ are chosen so that all the components of $A_1$ and $A_2$ are "small enough". The components are "small enough" when the expression $(A_1+A_2)$ has entries in the range $(-q/2, q/2]$ most of the time. If this is true, then $a' = A_1 + A_2$, without modular reduction, and $$b \equiv a' (\text{mod } p)$$
$$\equiv A_1 (\text{mod } p) + A_2 (\text{mod } p)$$
$$\equiv (pg \cdot \phi)(\text{mod } p) + A_2 (\text{mod } p)$$
$$\equiv 0 (\text{mod } p) + A_2 (\text{mod } p)$$
$$\equiv A_2 (\text{mod } p)$$
$$\equiv f \cdot m (\text{mod } p).$$

Hence, $$c \equiv f_p^{-1} \cdot b (\text{mod } p)$$
$$\equiv f_p^{-1} \cdot (f \cdot m)(\text{mod } p)$$
$$\equiv (f_p^{-1} \cdot f) \cdot m (\text{mod } p)$$
$$\equiv m (\text{mod } p).$$

In another embodiment, the Walsh-Hadamard Transform can be used to increase the speed of the REX cryptosystem. The Walsh-Hadamard Transform of a vector a is the polynomial A with components:

$$A[i] = \Sigma_j a[j](-1)^{(i,j)}, \text{ for } 0 \leq i \geq N-1,$$

where $(i, j) \equiv \Sigma_k i_k j_k (\text{mod } 2)$. Note that $i_k$ is the $k^{th}$ bit of the binary representation of i. For each component A[i], the Walsh-Hadamard transform can be computed using $\log_2 N$ addition or subtraction operations on the components of a. (For illustrative ease only, it is assumed that subtraction operations are of the same complexity as addition operations.) Thus, computing the Walsh-Hadamard transform of the vector a requires (N log$_2$ N) operations.

The inverse Walsh-Hadamard transform of polynomial A maps the polynomial A back to the vector a and is computed component-wise as:

$$a[i] = \frac{1}{N}\sum_j A[j](-1)^{(i,j)}, \text{ for } 0 \le i \le N-1.$$

For each component a[i], the inverse Walsh-Hadamard transform can be computed using log$_2$ N addition (or subtraction) operations on the components of A, and a multiplication by a factor of 1/N. Thus, computing the complete inverse Walsh-Hadamard transform vector a requires N log$_2$ N addition (or subtraction) operations on the components of vector a and N multiplication operations.

The REX cryptosystem can be implemented using the Walsh-Hadamard transforms as described above in order to increase the speed of the cryptosystem. From a practical standpoint, the number of operations required to manipulate the Walsh-Hadamard transformations are fewer than the number of operations required to calculate the products of vectors. In particular, the steps described above can be performed due to the determination of certain characteristics of the vector space.

The first attribute of the Walsh-Hadamard transform on the ring $R_{XOR}$ is if c=a·b, then C[i]=A[i] B[i], for $0 \le i \le N-1$. The proof is as follows:

$$\begin{aligned} C[i] &= \sum_j b[j](-1)^{(i,j)} \\ &= \sum_j \sum_k a[k]b[j \otimes k](-1)^{(i,k)+(i,j \otimes k)} \\ &= \sum_j a[k](-1)^{(i,k)} \sum_k b[j \otimes k](-1)^{(i,j \otimes k)} \\ &= \sum_j a[k](-1)^{(i,k)} \sum_l b[l](-1)^{(i,l)} \\ &= A[i]B[i] \end{aligned}$$

A second attribute of the Walsh-Hadamard transform on the ring $R_{XOR,q}$ is that if c=a·b (mod q), then C[i]=A[i] B[i] (mod q). Thus, the product c=a·b (mod q) can be computed by computing the Walsh-Hadamard transforms of the vectors a and b, and the inverse Walsh-Hadamard transform c of C. An advantage of using the Walsh-Hadamard transformation is the reduction in the number of operations being performed for the REX cryptosystem. The computation of the Walsh-Hadamard transforms A and B from vectors a and b requires only 2N log$_2$ N addition (or subtraction) operations. The computation of C[i]=A[i]B[i](mod q) requires only N multiplication operations. The computation of the inverse Walsh-Hadamard transform c of C requires 2N log$_2$ N addition (or subtraction) operations and N multiplication operations. Hence, the implementation of the Walsh-Hadamard transform in the REX cryptosystem is very efficient when computing inverses in the ring $R_{XOR}$, $R_{XOR,q}$ and $R_{XOR,p}$.

A third attribute of an implementation of the Walsh-Hadamard transform is the savings due to pre-computing some of the transforms. For example, the Walsh-Hadamard transform of the identify vector (1, 0, . . . , 0) on the ring $R_{XOR}=Z_q^N$ is the vector (1, 1, . . . , 1). The Walsh-Hadamard transform $F_q^{-1}$ of $f_q^{-1}$ satisfies $F_q^{-1}[i] \equiv F[i]^{-1} \pmod{q}$, for $0 \le i \le N-1$. The Walsh-Hadamard transform $F_p^{-1}$ of $f_p^{-1}$ satisfies $F_p^{-1}[i] \equiv F[i]^{-1} \pmod{p}$, for $0 \le i \le N-1$. Furthermore, f has an inverse modulo q and p if and only if $F[i] \ne 0 \pmod{q}$ and $F[i] \ne 0 \pmod{p}$, for $0 \le i \le N-1$.

Figure 4:
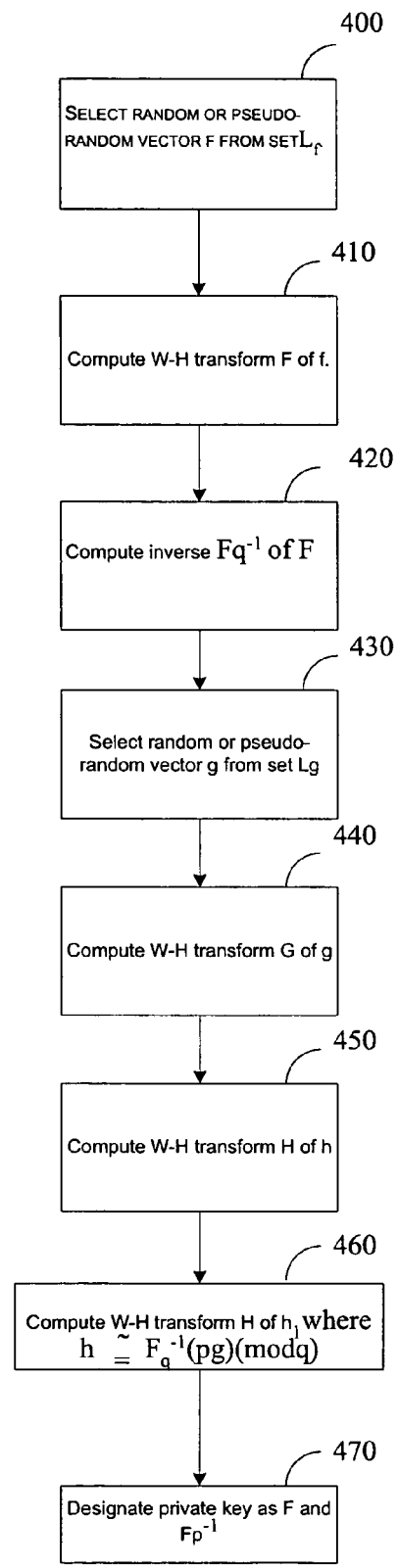
FIG. 4 describes an embodiment of the REX public key creation step that uses the Walsh-Hadamard transform.

FIG. 4 describes an embodiment of the REX public key creation step that uses the Walsh-Hadamard transform. At step 400, Alice chooses a random or pseudo-random vector f from the set $L_f$.

At step 410, Alice computes the Walsh-Hadamard transform F of f, wherein the computation is not performed modular q.

At step 420, Alice computes the vector inverse $F_q^{-1}$ of F by determining $F_q^{-1}[i] \equiv F[i]^{-1} \pmod{q}$, for $0 \le i \le N-1$.

At step 430, Alice computes the vector inverse $F_p^{-1}$ of F by determining $F_p^{-1}[i] \equiv F[i]^{-1} \pmod{p}$, for $0 \le i \le N-1$.

At step 440, Alice chooses a random or pseudo-random vector g from the set $L_g$.

At step 450, Alice computes the Walsh-Hadamard transform G of g.

At step 460, Alice computes the Walsh-Hadamard transform H of $h \equiv f_q^{-1} \cdot (pg) \pmod{q}$, by computing:

$$H[i] \equiv F_q^{-1}[i]pG[i] \pmod{q}, \text{ for } 0 \le i \le N-1.$$

At step 470, Alice designates the private key as being the two Walsh-Hadamard transforms F and $F_p^{-1}$. The vector g is not required for encryption or decryption, so it may be discarded. However, the vector g should remain secret. In addition, the Alice designates the public key as the Walsh-Hadamard transform H.

Figure 5:
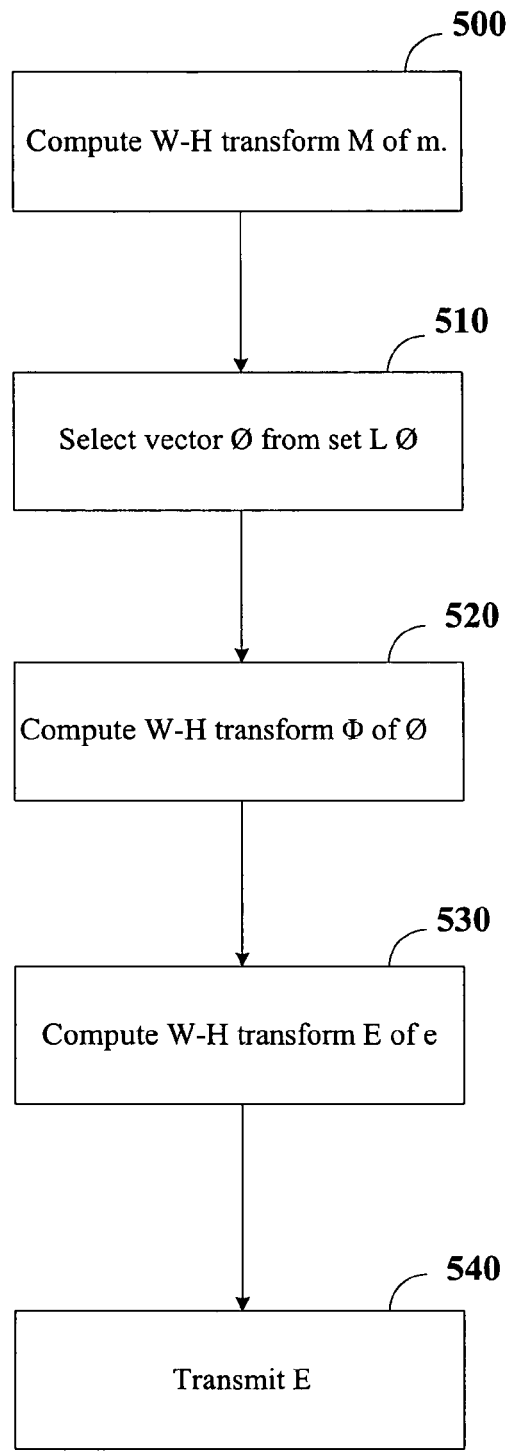
FIG. 5 describes the encryption step of the REX using the Walsh-Hadamard transform.

FIG. 5 describes the encryption step of the REX using the Walsh-Hadamard transform. Let message m be a vector with components in the range [0, p−1]. Hence, message m can be considered as a vector in the ring $R_{XOR,p}$. Given the public key h, Bob can perform the following steps to encrypt the message m.

At step 500, Bob computes the Walsh-Hadamard transform M of m.

At step 510, Bob chooses a random or pseudo-random vector φ from $L_\phi$.

At step 520, Bob computes the Walsh-Hadamard transform Φ of vector φ.

At step 530, Bob computes the Walsh-Hadamard transform E of the vector e, wherein the vector e is defined as:

$$e \equiv (\phi \cdot h) + m \pmod{q}.$$

Hence, the Walsh-Hadamard transform E is determined by the following relationship:

$$E[i] \equiv \Phi[i]H[i] + M[i] \pmod{q}, \text{ for } 0 \le i \le N-1.$$

At step 540, the Bob transmits the Walsh-Hadamard transform E to Alice, wherein the Walsh-Hadamard transform E is the encrypted message.

Figure 6:
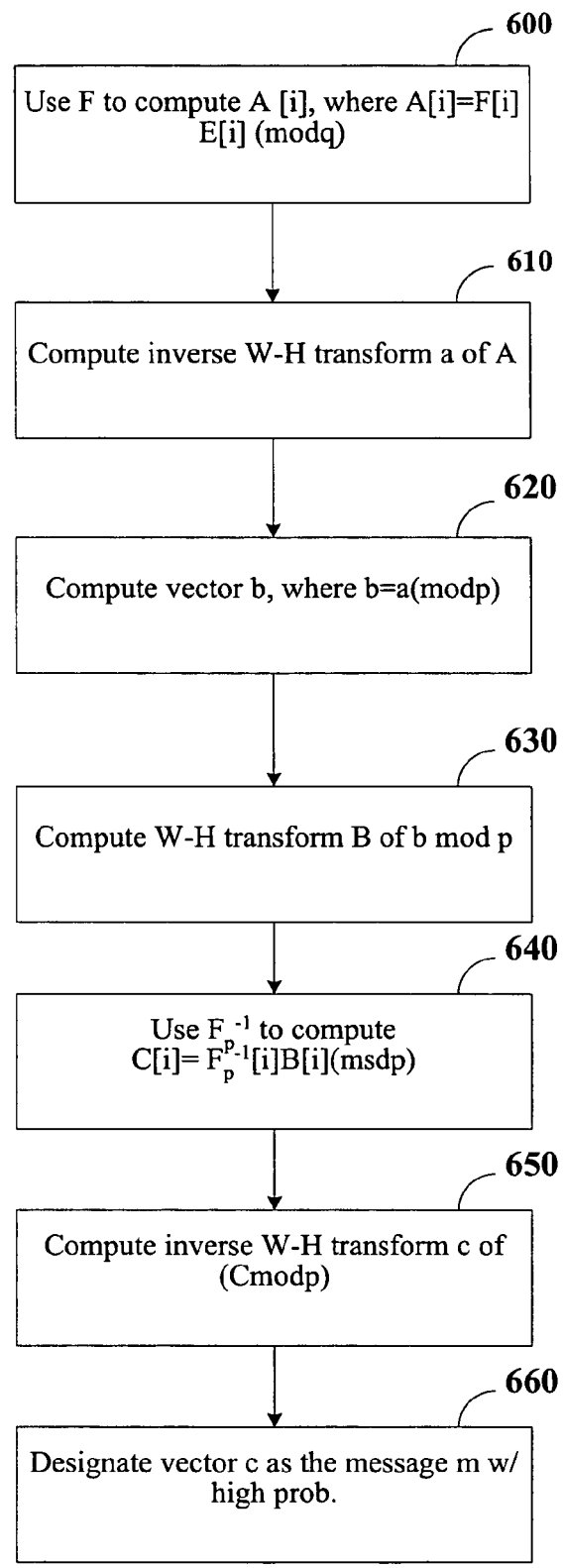
FIG. 6 describes the decryption step that is performed when an encrypted message vector E is received.

FIG. 6 describes the decryption step that is performed by Alice when Alice receives an encrypted message vector E. At step 600, Alice uses private key vector F to compute A[i] in accordance with the relationship:

$$A[i] \equiv F[i]E[i] \pmod{q}, \text{ for } 0 \le i \le N-1.$$

At step 610, Alice computes the inverse Walsh-Hadamard transform a of polynomial A (reducing modulo q). Alice ensures that all components of inverse Walsh-Hadamard transform a lie in the range of (−q/2, q/2], noting that:

$$a \equiv f \cdot e \pmod{q}.$$

At step 620, Alice computes the vector b a (mod p).

At step 630, Alice computes the Walsh-Hadamard transform B of vector b modulo p.

At step 640, Alice uses private key vector $F_p^{-1}$ to compute:

$$C[i] \equiv F_p^{-1}[i] B[i] \pmod{p}, \text{ for } 0 \leq i \leq N-1.$$

At step 650, Alice computes the inverse Walsh-Hadamard transform c of (C modulo p), noting that $c \equiv f_p^{-1} \cdot b \pmod{p}$.

At step 660, Alice designates the vector c as the message m with high probability.

The embodiments described above that implement the Walsh-Hadamard transform within the REX cryptosystem uses a reduced number of operations, which correspondingly reduces the complexity of the cryptosystem. This complexity reduction is in addition to the complexity reduction for computing public keys. Part of the complexity reduction arises due to the reduced number of transformations performed in the overall encoding and decoding of a message.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The embodiments of the REX cryptosystem described above may be implemented by software, hardware, or combination thereof. At least one processing element and at least one memory element may be communicatively coupled to execute a software program or set of microcodes to implement the method steps described above.

Those of skill would further appreciate that the various illustrative logical blocks, modules, circuits, and algorithm steps described in connection with the embodiments of the REX cryptosystem disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method for efficiently generating, using a processor, two private keys and a public key for a ring-based cryptosystem, comprising:

the processor selecting a primary vector from a primary ring $R_{XOR}$, wherein the primary ring $R_{XOR}$ has elements from the set of N-dimensional vectors with integer coefficients $Z^N$ and is distinguished by the operations:

$$(f+g)[i] = f[i] + g[i], \text{ and}$$

$$(f \cdot g)[i] = \sum_{j=0,\ldots,N-1} (f[j]g[i \otimes j]), \text{ for } 0 \leq i \leq N-1;$$

where f is an element of the primary ring $R_{XOR}$, g is an element of the primary ring $R_{XOR}$, and $\oplus$ represents an exclusive OR operation between the i and j values;

the processor computing a transform of the primary vector;

the processor computing a first private key from a secondary ring $R_{XOR,q}$, wherein $R_{XOR,q}$ comprises the elements of $R_{XOR}$ reduced modulo q, and the first private key is computed using the multiplicative inverse reduced modulo q of each component of the transformed primary vector;

the processor computing a second private key from a secondary ring $R_{XOR,p}$, wherein $R_{XOR,p}$ comprises the elements of $R_{XOR}$ reduced modulo p, and the second private key is computed using the multiplicative inverse reduced modulo p of each component of the transformed primary vector, and q and p are co-prime integer values; and the processor using the first private key to generate a public key, wherein the public key is for encrypting a message and the second private key is used for decrypting the message.

2. The method of claim 1, wherein the transform is a Walsh-Hadamard transform.

3. An apparatus for efficiently generating two private keys and a public key for a ring-based cryptosystem, comprising:

at least one memory element; and at least one processing element configured to execute a set of instructions stored in the at least one memory element, the set of instructions for:

selecting a primary vector from a primary ring $R_{XOR}$, wherein the primary ring $R_{XOR}$ has elements from the set of N-dimensional vectors with integer coefficients $Z^N$ and is distinguished by the operations:

$$(f+g)[i] = f[i] + g[i], \text{ and}$$

$$(f \cdot g)[i] = \sum_{j=0,\ldots,N-1} (f[j]g[i \oplus j]), \text{ for } 0 \leq i \leq N-1;$$

where f is an element of the primary ring $R_{XOR}$, g is an element of the primary ring $R_{XOR}$, and $\oplus$ represents an exclusive OR operation between the i and j values;

computing a transform of the primary vector;

computing a first private key from a secondary ring $R_{XOR,q}$, wherein $R_{XOR,q}$ comprises the elements of $R_{XOR}$ reduced modulo q, and the first private key is computed using the multiplicative inverse reduced modulo q of each component of the transformed primary vector;

computing a second private key from a secondary ring $R_{XOR,p}$, wherein $R_{XOR,p}$ comprises the elements of $R_{XOR}$ reduced modulo p, and the second private key is computed using the multiplicative inverse reduced modulo p of each component of the transformed primary vector, and q and p are co-prime integer values; and using the first private key to generate a public key, wherein the public key is for encrypting a message and the second private key is used for decrypting the message.

4. The apparatus of claim 3, wherein the transform is a Walsh-Hadamard transform.

5. An apparatus for efficiently generating two private keys and a public key for a ring-based cryptosystem, comprising:

means for selecting a primary vector from a primary ring $R_{XOR}$, wherein the primary ring $R_{XOR}$ has elements from the set of N-dimensional vectors with integer coefficients $Z^N$ and is distinguished by the operations:

$$(f+g)[i] = f[i] + g[i], \text{ and}$$

$$(f \cdot g)[i] = \sum_{j=0,\ldots,N-1} (f[j]g[i \oplus j]), \text{ for } 0 \leq i \leq N-1;$$

where f is an element of the primary ring $R_{XOR}$, g is an element of the primary ring $R_{XOR}$, and $\oplus$ represents an exclusive OR operation between the i and j values;

means for computing a transform of the primary vector;

means for computing a first private key from a secondary ring $R_{XOR,q}$, wherein $R_{XOR,q}$ comprises the elements of $R_{XOR}$ reduced modulo q, and the first private key is computed using the multiplicative inverse reduced modulo q of each component of the transformed primary vector;

means for computing a second private key from a secondary ring $R_{XOR,p}$, wherein $R_{XOR,p}$ comprises the elements of $R_{XOR}$ reduced modulo p, and the second private key is computed using the multiplicative inverse reduced modulo p of each component of the transformed primary vector, and q and p are co-prime integer values; and means for using the first private key to generate a public key, wherein the public key is for encrypting a message and the second private key is used for decrypting the message.

6. The apparatus of claim 5, wherein the transform is a Walsh-Hadamard transform.

7. A computer program product, comprising:

a non-transitory computer-readable medium having a stored computer program, comprising:

instructions for causing a computer to select a primary vector from a primary ring $R_{XOR}$, wherein the primary ring $R_{XOR}$ has elements from the set of N-dimensional vectors with integer coefficients $Z^N$ and is distinguished by the operations:

$$(f+g)[i] = f[i] + g[i], \text{ and}$$

$$(f \cdot g)[i] = \sum_{j=0,\ldots,N-1} (f[j]g[i \oplus j]), \text{ for } 0 \leq i \leq N-1;$$

where f is an element of the primary ring $R_{XOR}$, g is an element of the primary ring $R_{XOR}$, and $\oplus$ represents an exclusive OR operation between the i and j values;

instructions for causing a computer to compute a transform of the primary vector;

instructions for causing a computer to compute a first private key from a secondary ring $R_{XOR,q}$, wherein $R_{XOR,q}$ comprises the elements of $R_{XOR}$ reduced modulo q, and the first private key is computed using the multiplicative inverse reduced modulo q of each component of the transformed primary vector;

instructions for causing a computer to compute a second private key from a secondary ring $R_{XOR,p}$, wherein $R_{XOR,p}$ comprises the elements of $R_{XOR}$ reduced modulo p, and the second private key is computed using the multiplicative inverse reduced modulo p of each component of the transformed primary vector, and q and p are co-prime integer values; and instructions for causing a computer to use the first private key to generate a public key, wherein the public key is for encrypting a message and the second private key is used for decrypting the message.

8. The computer program product of claim 7, wherein the transform is a Walsh-Hadamard transform.

* * * * *